United States Patent [19]

Aizawa et al.

[11] 4,099,192
[45] Jul. 4, 1978

[54] PHOTOGRAPHIC CAMERA WITH AN ELECTROMAGNETIC CONTROL SYSTEM

[75] Inventors: Hiroshi Aizawa, Machida; Masanori Uchidoi, Kawasaki; Hideaki Miyakawa, Inagi; Masayoshi Yamamichi, Kawasaki; Yukio Iura, Yokosuka; Masahisa Fukui, Yokohama, all of Japan

[73] Assignee: Canon Kabushiki Kaisha, Tokyo, Japan

[21] Appl. No.: 764,291

[22] Filed: Jan. 31, 1977

Related U.S. Application Data

[63] Continuation of Ser. No. 594,438, Jul. 9, 1975.

[30] Foreign Application Priority Data

Jul. 12, 1974 [JP] Japan .................................. 49-80010

[51] Int. Cl.² .............................................. G03B 9/08
[52] U.S. Cl. ..................................... 354/234; 354/235
[58] Field of Search ................ 354/234, 235; 335/227, 335/229, 234, 296, 297

[56] References Cited

U.S. PATENT DOCUMENTS

| 3,533,345 | 10/1970 | Starp ....................... 354/234 |
| 3,635,141 | 1/1972 | Starp et al. ............... 354/234 |
| 3,784,291 | 1/1974 | Hirata et al. ............. 354/234 |

OTHER PUBLICATIONS

"Alumina Doped Lithium Bearing Ferrites", IBM Tech. Dis., vol. 11, #7, Dec. 1968, pp. 795-796.
Hysteresis Table from the Handbook of Chemistry & Physics, 30th Edition, p. 1989.
Definition of "Hysteresis Loop", IEEE Standard Dictionary of Electrical & Electronic Terms, p. 267.

*Primary Examiner*—Russell E. Adams
*Attorney, Agent, or Firm*—Toren, McGeady and Stanger

[57] ABSTRACT

A photographic camera having a magnetic actuating device associated with an electronic control device for initiating a release of one or more of the camera mechanisms from the cocked position thereof. In one embodiment of the invention, the magnetic actuating device comprises a single magnetic winding with a core material having a substantially rectangular hysteresis loop, and an armature of which the movement is controlled by the polarity of the magnetic winding and which is connected to spring-biased means for latching the mechanism in the cocked position. After the core is magnetized by applying a voltage to the magnetic winding for a relatively short period to hold the armature with the latching means in the cocked position against the force of the spring, the magnetic winding is energized by an output of the opposite polarity from the electronic control device causing the armature to move away from the core, whereby the release of the mechanism is initiated.

5 Claims, 12 Drawing Figures

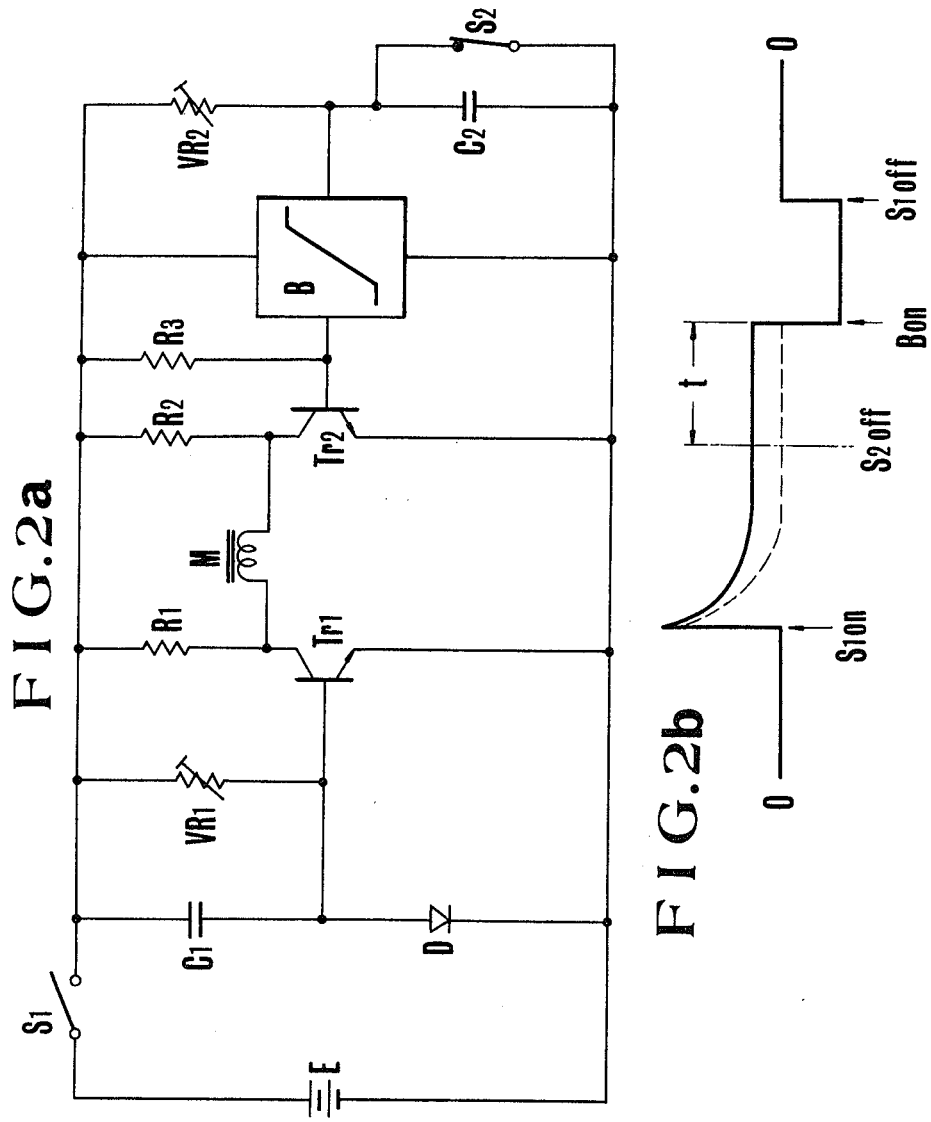

FIG.7a
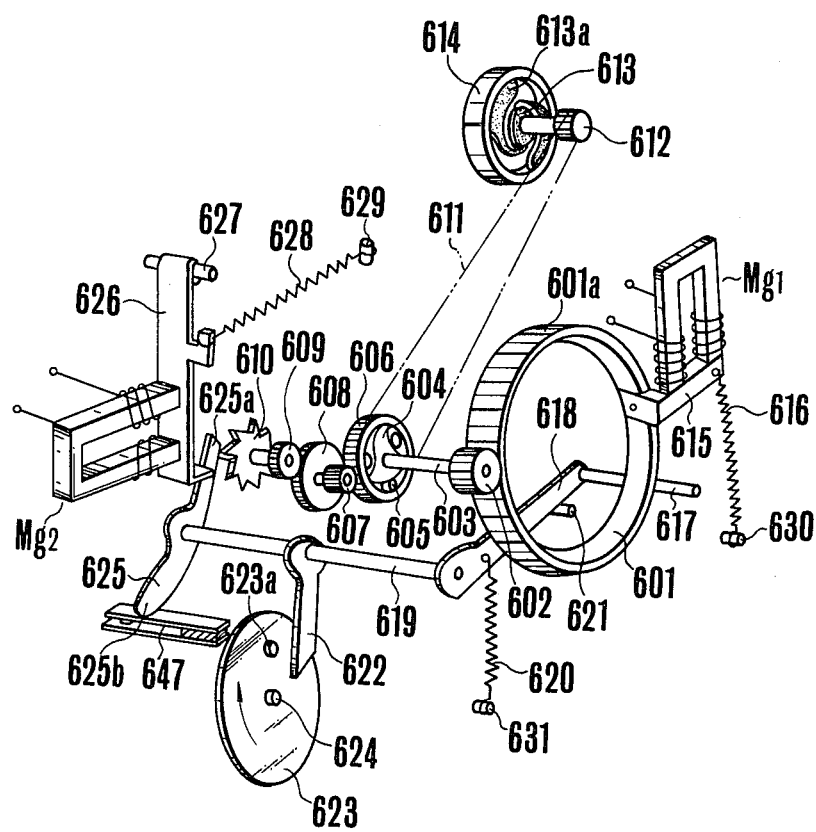
FIG.7c
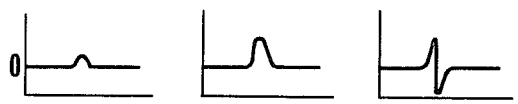
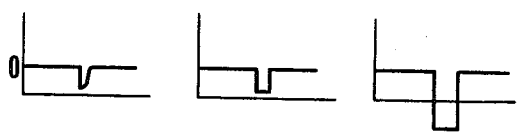

PHOTOGRAPHIC CAMERA WITH AN ELECTROMAGNETIC CONTROL SYSTEM

This is a continuation of application Ser. No. 594,438, filed July 9, 1975.

BACKGROUND OF THE INVENTION

1. Field of the Invention

This invention relates to photographic cameras, and, more particularly, to an electromagnetic control device constructed by employment of a core material having rectangular hysteresis curve magnetizing characteristics.

2. Description of the Prior Art

It is known to utilize electromagnets in constructing actuating devices for actuating various mechanisms of a camera from the shutter cocked positions and for controlling the period of actuation thereof in cooperation with electronic control devices therefor. For easier management of a battery operated camera with the decreased bulk and weight thereof, it is generally required to select a battery of small capacity, i.e. providing a low voltage and weak current, for employment as the electrical power source of the camera. With this regard, the electromagnet must be designed for correspondingly limited output power and energy consumption. In order to secure reliable performance of the electromagnet under the circumstances of this limitation, a solution has been proposed and found practical use in initiating a release of one or more of the camera mechanisms from the cocked position. According to this proposal, before a control pulse is applied to the solenoid of the electromagnet to initiate the release of the mechanism, the armature of the electromagnet which is operatively connected to the control member for the mechanism is previously held in the cocked position.

There are two methods of maintaining the armature in the cocked position, one of which is to energize the solenoid until a deactuating pulse is applied thereto, and the other of which is to utilize a resetting member for the mechanism in assisting the electromagnet to operate in such a manner that as soon as the resetting member is caused to escape from the path of movement of the control member of the mechanism in timed relation to the initiation of the energization of the solenoid, while still leaving the armature in the cocked position. With this arrangement, it is possible to minimize the period of energization of the solenoid and to reduce the energy consumption of the battery. In application to magnetic shutter control systems, the first-named method, however, has a disadvantage of consuming electrical energy at a high rate particularly when long shutter intervals are selected, as for example, in making bulb photography because the solenoid of an electromagnet controlling closing operation of the rear curtain of the shutter must be energized at least during the entire length of exposure time. In the case of the second-named method, although the disadvantage of premature consumption of the battery can be eliminated, it is unavoidable to increase the complexity of the magnetic control device and to employ means for establishing the timed relation mentioned above in operative connection therewith, or otherwise the satisfactorily accurate and reliable actuation control can not be effected. This in turn, calls for an increase in the product cost and the possibility of occurrence of damages of the combined device and means.

SUMMARY OF THE INVENTION

Accordingly, an object of the present invention is to eliminate the above mentioned drawbacks and to provide a magnetic control device for use in a photographic camera wherein the armature of an electromagnet can be brought into the cocked position by application of an actuating pulse of relatively short duration of the solenoid thereof and can be maintained in this state regardless of however long the period of actuation of a mechanism associated with the magnetic control device is, thereby permitting a remarkable reduction of electrical energy consumption.

Another object of the present invention is to provide a magnetic control device for use in a photographic camera associated with an electronic control device, wherein the electronic control device provides a deactuating pulse which is then applied to the solenoid of the electromagnet to reduce the magnetic flux to zero, or to increase in the opposite direction, thereby the armature is caused to move from the cocked position in more accurate and reliable response to the advent of the deactuating pulse than has heretofore been attainable in the conventional magnetic control device of the type described.

Other objects and features of the present invention will become apparent from the following detailed description taken in conjunction with the accompanying drawings in which:

BRIEF DESCRIPTION OF THE DRAWINGS

FIG. 2a is a circuit diaphragm of a simple example of an electronic control device associated with an electromagnetic actuating device according to one embodiment of the present invention.

FIG. 2b is a curve showing a variation with time of current flowing through the magnetic winding of FIG. 2a.

FIG. 7a is a schematic exploded perspective view of an automatic focusing mechanism incorporated in a camera and employing magnetic actuating devices of the present invention.

FIG. 7b is a schematic circuit diagram, partially in block form, of a control system for the mechanism of FIG. 7a.

FIG. 7c shows a diagram showing various wave forms attendant on the operation of the system including magnetic actuating device of FIGS. 7a and 7b.

DESCRIPTION OF THE PREFERRED EMBODIMENTS

Figures 1A, 1B:
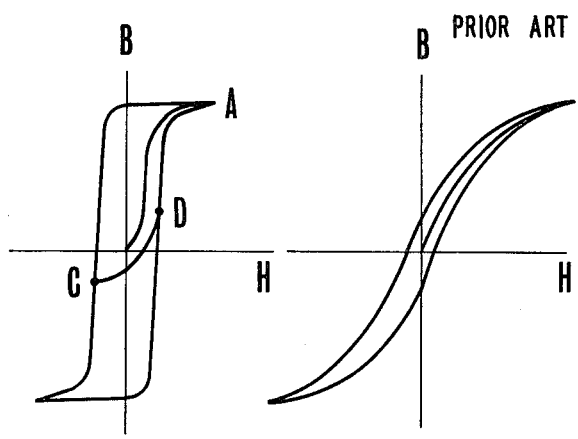
FIG. 1a shows a typical example of the substantially rectangular hysteresis loop appearing in an electromagnet with a core material usable in the present invention.
FIG. 1b shows a hysteresis loop appearing in the prior art electromagnet.
Figure 1C:
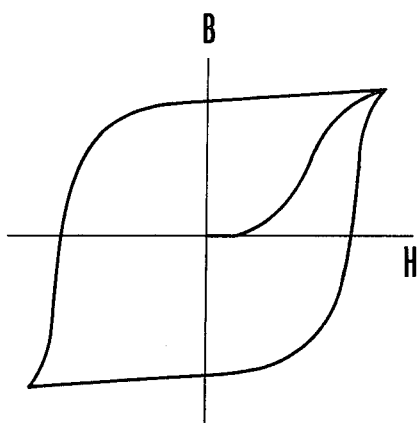
FIG. 1c shows a rectangular hysteresis loop of large area appearing in an electromagnet with a core material unsuitable for use in the present invention.

FIG. 1 shows how a magnetic winding with a core of different material establishes a different magnetic flux. When the core is made of a soft magnetic substance such as Permalloy, the flux varies with one cycle of AC flow as shown in FIG. 1b, while when the core is made of a hard magnetic substance such as Almico, the flux varies with one cycle of AC flow as shown in FIG. 1c. These soft and hard magnetic substances can not be advantageously employed in the present invention. Recently, the technical requirements in the field of magnetic memory art have developed new magnetic substances which provide a substantially rectangular hysteresis loop as shown in FIG. 1a. As is evident from FIG. 1a in comparison with FIGS. 1b and 1c, the rectangular hysteresis loop exhibiting magnetic substance usable in the present invention has an intermediate magnetizing characteristic between those of the hard and soft magnetic substances. At a relatively low magnetizing force H, the magnetic flux reaches its maximum and is maintained almost constant at a level near the maximum even when the magnetizing force H is reduced to zero. As the magnetizing force H reverses, the flux B rapidly drops and then rises in an opposite direction to a maximum at a relatively low magnetizing force H. This series of events takes place in the reversed process, forming a loop which is symmetrical with respect to the original point. With the core made of such a rectangular hysteresis loop exhibiting magnetic substance, it is possible to attract an armature by application of an actuating pulse of relatively short duration to the magnetic winding having the core and thereafter to maintain the armature in the attracted position under a force almost equal to that corresponding to the maximum flux despite of the fact that no current or very weak current is allowed to flow through the magnetic winding after the termination of the duration of the actuating pulse. It is to be noted that the pulse current in the magnetic winding with the core of FIG. 1a requires a weaker current than the magnetic windings with those of FIGS. 1b and 1c to produce equivalent magnetizing force. At the termination of actuation thereof, a deactuating pulse of an opposite polarity to that of the actuating pulse is applied to the magnetic winding for a predetermined duration to establish zero flux in the core, thereby the armature is caused to move away from the core which in turn causes initiation of a release of a camera mechanism having a control member associated with the armature. This cycle of events repeats itself in a minor loop which can be traced from the original point through points A, C and D to A provided that the core initially has no magnetism.

In FIG. 2a, there is shown a simple example of an electronic control device adapted for association with the magnetic winding of an electromagnet having the function described in connection with FIG. 1. The control circuit essentially comprises first and second pulse shapers and a single magnetic winding connected between the outputs of the first and second pulse shapers. The first pulse shaper for producing an actuating pulse comprises a switching transistor $Tr_1$ having a base connected to the junction of the connection of the series combination of a capacitor $C_1$ and a diode D, having an emitter connected to the negative bus and having a collector connected through a resistor $R_1$ to the positive bus, and a variable resistor $VR_1$ connected across the capacitor $C_1$. The second pulse shaper for producing a deactuating pulse comprises a transistor $Tr_2$ having a collector connected through a resistor $R_2$ to the positive bus, having an emitter connected to the negative bus and having a base connected through a switching circuit B to the output of a timing circuit containing a variable resistor $VR_2$ and capacitor $C_2$, a resistor $R_3$ connected between the positive bus and the base of transistor $Tr_2$, and a switch $S_2$ connected across the capacitor $C_2$. The magnetic winding M is connected between the collectors of transistors $Tr_1$ and $Tr_2$. The positive bus is connected through a main switch $S_1$ to the positive terminal of a battery, and the negative bus to the negative terminal of battery E.

In operation, when switch $S_1$ is closed, transistor $Tr_1$ is rendered conducting causing a current to flow through resistors $R_1$ and $R_2$ and magnetic winding M to the collector of transistor $Tr_1$, thereby a flux is established in the core of electromagnet M. By varying the resistance value of variable resistor $VR_1$, the current is varied with time as shown in FIG. 2b, wherein a curve indicated by dashed line corresponds to infinite resistance value. With the variable resistor $VR_1$ adjusted to a proper setting, for example, to a resistance value providing a voltage balanced with the voltage between the base and emitter of transistor $Tr_1$, it is possible to flow a weak current through the magnetic winding M, as shown by solid line in FIG. 2b.

Next, when switch $S_2$ is opened, the capacitor $C_2$ begins to be charged through variable resistor $VR_2$. In a time interval dependent upon the RC time constant, designated by $t$, the switching circuit B is turned on to produce an output which is applied to the base of transistor $Tr_2$, thereby transistor $Tr_2$ is rendered conducting causing a current to flow through resistors $R_1$ and $R_2$ to the collector of transistor $Tr_2$ to establish zero flux in the core of electromagnet M, thereby an armature not shown of the electromagnet is moved away from the core by not shown spring-biased means associated therewith. The time interval, $t$, may be utilized as the exposure time.

Figure 3:
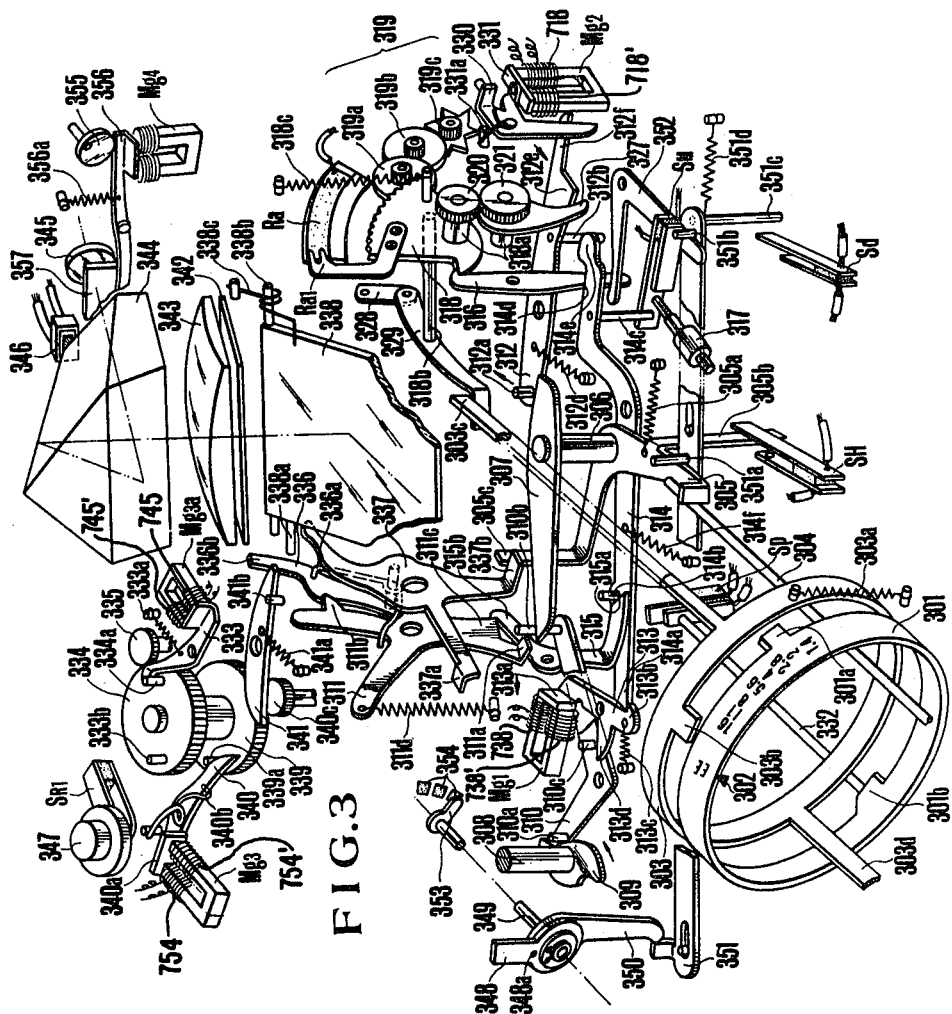
FIG. 3 is a schematic exploded perspective view of the essential components of a single lens reflex camera employing a number of magnetic actuating devices constructed in accordance with another embodiment of the present invention and associated with a camera release mechanism, diaphragm control mechanism, shutter mechanism and self-timer respectively.
Figure 4:
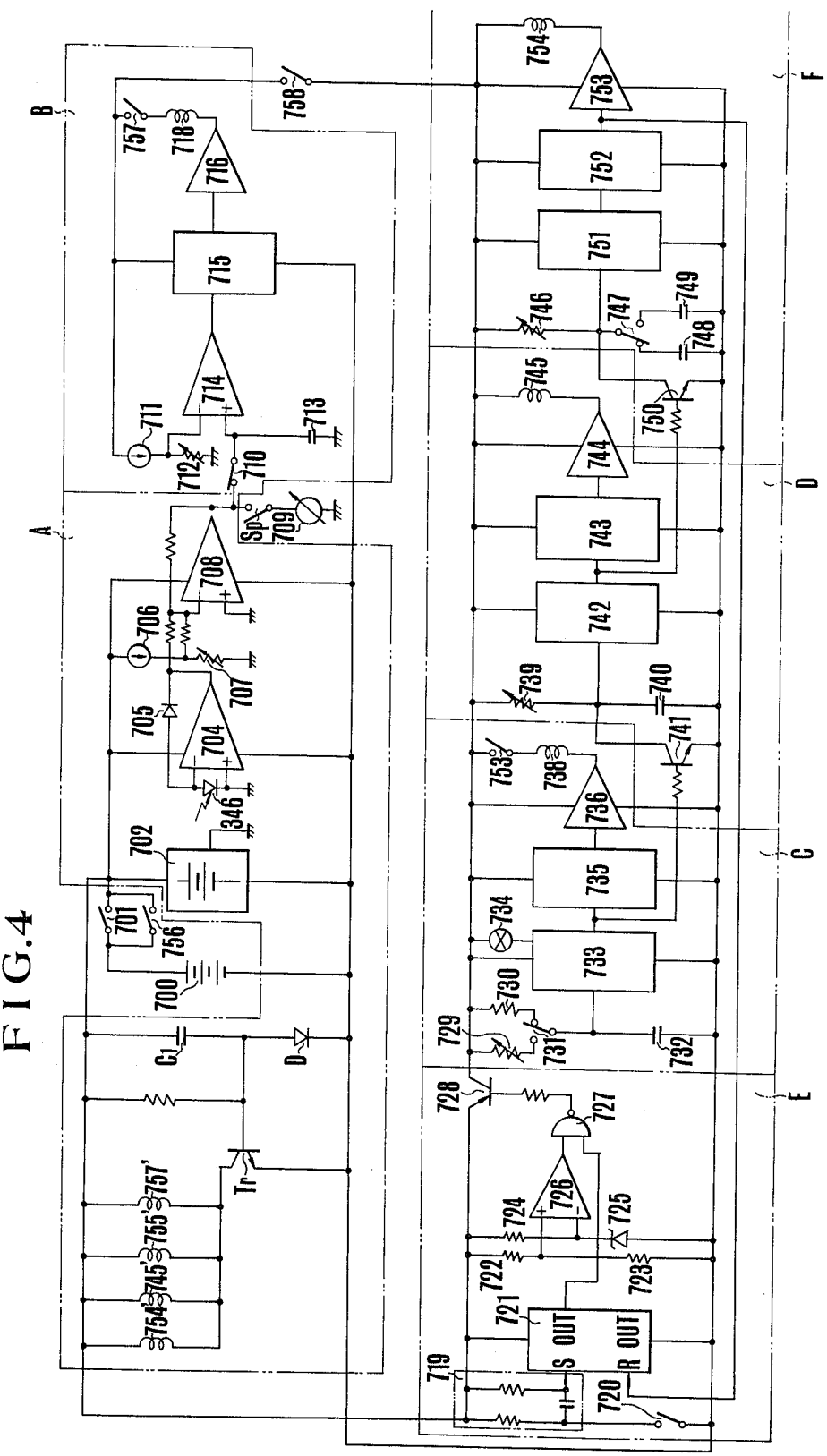
FIG. 4 is a circuit diagram of combined electronic control devices for the actuating devices of FIG. 3 connected in an exposure control circuit of the camera of FIG. 3.

Referring now to FIGS. 3 and 4, there is shown a practical example of application of the present invention to a single lens reflex camera with an automatic exposure control system, wherein there is provided five electromagnetic actuating devices having electromagnets $Mg_1$, $Mg_2$, $Mg_3$ and $Mg_4$ each electromagnet having a pair of magnetic windings, and associated with a camera release mechanism, diaphragm control mechanism, shutter mechanism and self-timer respectively, each of which will now be described in detail.

A lens aperture mechanism provided in the lens barrel not shown comprises a manually rotatable diaphragm preselecting ring 301 having cut thereon a symbol EE indicative of the shutter preselection automatic exposure control mode and a diaphragm scale which the graduations each can be brought into registry with a stationary index 302, and having a stop lug 301a and a cam lobe 301b, and an automatically rotatable diaphragm presetting ring 303 which is biased by a spring 303a in a clockwise direction and which has a lug 303b movable into engagement with the stop lug 301a. The diaphragm presetting ring 303 is provided with first and second arms 303c and 303d which extend parallel to the optical axis of the objective lens rearwardly and forwardly respectively. The position of the second arm 303c determines the position of a not shown bellcrank member through a not shown cam ring, which in turn determines the amount of movement of a not shown drive ring member for the diaphragm blade assembly, thereby the size of the exposure aperture is adjusted in conformance to the preselected or automatically controlled setting of the diaphragm setting ring 303. The drive ring member has a pin 304 fixedly mounted thereon and rearwardly extending parallel to the optical axis of the objective lens into the path of movement of the drive lever 305 of the diaphragm control mechanism.

The diaphragm control mechanism includes the two-armed drive lever 305 for the lens aperture mechanism pivoted about a shaft 306 and biased in a counter-clockwise direction by a spring 305a which tends to urge an extension 305b perpendicularly downwardly extending from the one of the arms of lever 305 which engages with pin 304 for operative engagement with a normally open switch or hold switch SH and to urge the upwardly rectangularly bent end portion 305c of the other arm for normally abutting engagement with a rectangularly bent portion 337b of a mirror control lever 337, an escapement 312 which serves as a resetting member for the diaphragm presetting ring 303 when the cocking mechanism of the camera is operated, and a transmission which serves to convert ever varying actual aperture sizes into corresponding amounts of displacement of the slider $Ra_1$ of a variable resistor $Ra$ within a time interval between the time when the shutter release button is depressed and the time when the front curtain runs down. This transmission comprises a gear sector 318 which is fixedly mounted on a rotatable shaft 318a and which is latched in the cocked position by a pawl lever 316, a pinion 320 fixedly mounted on a shaft 318a and meshing with a gear 321 fixedly mounted on a rotatable shaft 322, an arm 237 radially extending from the shaft 322 and engaging at the free end thereof with one arm 312e of escapement 312, a diaphragm presetting ring control lever 329 pivoted at a pin on the free end portion of an arm 328, the opposite end thereof being pivotally mounted on the camera housing, and connected at the center to a pin 318 extending from gear sector 318 in eccentrically parallel relation to the shaft 318a, the free end of lever 329 bearing the end of arm 303c of diaphragm presetting ring 303 against the load of spring 303a, a governor including a gear 319a engaging with the gear segment of sector 318, a gear 319b engaging with gear 319a and a star wheel 319c, and an arresting lever 330 associated with a magnetic actuating device of the invention having an electromagnet $Mg_2$ and arranged with a spring 331a which tends to urge the lever 330 for counter-clockwise movement about a pivot pin thereof so that when zero flux is established in the electromagnet $Mg_2$, the pawl of lever 330 is brought into arresting engagement with one of the teeth of the star wheel 319c. The electromagnet $Mg_2$ comprises a pair of windings 718 and 757' (see FIG. 4), a U-shape core made of a rectangular hysteresis effect produceable magnetic substance described in connection with FIG. 1a, and an armature which is preferably made of the same substance as that of the core, but may be made of a soft magnetic substance such as Permalloy to obtain satisfactory results. In order to switch the electrical circuit of the diaphragm control mechanism between the automatic and manual exposure control modes, there is provided a change-over device comprising a detent pin 332 provided in the objective lens barrel and arranged to act as a cam follower on the cam lobe 301b and to cooperate at the opposite end thereof with a movable contact of a switch SP.

A view finder of the camera includes a mirror 338 pivotally mounted on a pair of stub shafts 338b and positioned between the objective lens and the focal plane shutter. The mirror 338, in its viewing position as shown in FIG. 1, reflects light entering through the objective lens upwards onto a focusing screen 342 where an image of the object area to be photographed is formed. Light from the image on the screen 342 is radiated upward through a condenser lens 343 into the bottom face of a penta prism 344. The prism 344 reflects the light entering the bottom face thereof to an eye piece 345 positioned behind the exit face of prism 344, whereby the image may be viewed through the eye-piece 345. There is also shown light value sensing means 346 such as a silicon blue cell positioned adjacent the exit surface of prism 344 to receive light coming from the predetermined area of the image on the focusing screen 342. In order to prevent light from entering reversely through the eye piece 345 into the camera to fog the film particularly when the exposure is made in the self-timer control mode, there is provided an opaque plate 357 mounted on a control lever 356 and arranged to be movable into or from a space between the exit face of prism 344 and eye-piece 345. The control lever 356 is associated with a magnetic actuating device of the invention having an electromagnet $Mg_4$ and cooperative with a cam disk 355 which will be described in detail later.

The mirror 338 is movable between its viewing and non-viewing positions by a control lever 337 pivotally mounted on a common shaft and of which the upwardly extending arm movably bears at the end portion thereof a stud 338a extending from the side of the support member of mirror 338. The mirror control lever 337 is operable from the outside of the camera housing through an intermediary not shown which acts on the rectangularly bent portion 337a of one arm thereof. The mirror mechanism further includes a spring powered drive lever 311 pivotal about the common shaft of control lever 337 and pretensioned by a spring 311d which urges the lever 311 to move counter-clockwise, and a mirror return control lever 336 which is pivoted at a pin mounted on mirror control lever 337 in eccentrically parallel relation to the common shaft thereof and which is biased by a spring 336a in a counter-clockwise direction to urge the lever 336 for engagement at an extension thereof with a pawl 311b of drive lever 311. So long as the lever 336 is engaged with the drive lever 311, the driving torque of lever 311 imparted by spring 311d is transmitted to the mirror control lever 337 and further therefrom to the diaphragm drive lever 305 through the extension 337b-and-extension 305c engagement.

The shutter mechanism comprises a focal plane shutter having front and rear curtains not shown which are controlled by gears 334 and 339 respectively coaxially mounted on a common shaft and meshing with pinions 335 and 500 fixedly mounted on respective shafts of front and rear curtain drums not shown. The gears 334 and 339 are held in the cocked position by front and rear curtain latch levers 333 and 340 respectively in engagement at their pawls with detent pins 334a and 339a respectively provided on gears 334 and 339. The latch lever 333 is biased by a spring 333a in a clockwise direction and is arranged to cooperate with a first magnetic actuating device having an electromagnet $Mg_{3a}$ in such a manner that when zero magnetic flux is established in the core of electromagnet $Mg_{3a}$ an armature mounted on the tail of latch lever 333 is moved away from the core under the action of spring 333a, thereby the pawl of lever 333 is disengaged from detent pin 334a. The latch lever 340 is biased by a spring 340a in a clockwise direction and is arranged to cooperate with a second magnetic actuating device having an electromagnet $Mg_3$ in such a manner that when zero magnetic flux is established in the core of electromagnet $Mg_3$, an armature 340a mounted on the tail of latch lever 340 is moved away from the core under the action of spring 340b, thereby the pawl of lever 340 is disengaged from detent pin 339a. The first and second electromagnets $Mg_{3a}$ and $Mg_3$ each have a pair of windings 745 and 745', and 754 and 754' respectively with their cores of U-shape being made of an identical magnetic substance to that of the core of electromagnet $Mg_2$. In order to return the mirror 338 to the viewing position as soon as the rear curtain runs down to the closed position, there is provided a two-armed lever 341 which is biased by a spring 341a in a clockwise direction to urge one of the two arms for abutment with a stop pin 341b, the other arm of which extends into the path of movement of detent pin 339a of rear curtain control gear 339 at a location near the most-advanced end thereof, so that when detent pin 339a strikes the former arm of lever 341 to turn lever 341 in a counter-clockwise direction against the force of spring 341a, the latter arm of lever 341 strikes the end 336b of lever 336 to disengage the extension of lever 336 from the pawl 311b of mirror drive lever 311, thereby the control lever 337 is turned in the clockwise direction causing the mirror 338 to return to the viewing position.

The release mechanism for actuating a release of the mirror and diaphragm mechanisms includes a shutter release button 347, a switch $SR_1$ positioned adjacent the shutter button 347 upon depression of button 347 to be closed to apply a deactuating signal to a magnetic winding 378 of an electromagnet $Mg_1$. The electromagnet $Mg_1$ has another magnetic winding 755' (see FIG. 4) and has a U-shape core made of an identical substance to that of the core of electromagnet $Mg_2$, $Mg_3$ or $Mg_4$. The release mechanism further includes a first latch lever 313 carrying an armature 313a of electromagnet $Mg_1$ and which is biased by a spring 313c in a clockwise direction, so that when zero magnetic flux is established in the electromagnet $Mg_1$ with its core, the first latch lever 313 is turned clockwise to disengage a pawl 313b of lever 313 from one end 314a of a release lever 314 which is biased by a spring 314f in a counter-clockwise direction. The release lever 314 is arranged upon actuation or disengagement from first latch lever 313 to release the mirror drive lever 311 and diaphragm control gear sector 318 from their cocked or locked positions through the respective intermediaries including second and third latch levers 315 and 316 respectively. The second latch lever 315 has a tapered portion 315a formed on the end of rectangularly bent portion of one arm thereof and arranged for normal abutment with a pin 314b mounted on the release lever 314, and has a pawl 315b formed on the end of the other arm thereof and arranged to be brought into engagement with a projection 311c of mirror drive lever 311 when the cocking mechanism is operated. The third latch lever 316 is arranged for abutting engagement at its tail with the one arm 314d of release lever 314 opposite to that cooperating with the second latch lever 315. The tail of the third latch lever 316 also engages with one arm of a L-shape transfer lever 352, the other arm of which extends into the path of travel of a pin 351b mounted on a slide 351 constituting part of a manually operable mechanism for bringing the diaphragm blades not shown from the fully open position to a position corresponding to the preselected diaphragm value with this mechanism, the photographer is informed how much light value the exposure metering apparatus derives at the preselected effective exposure aperture and how long the depth of focus is at the same aperture, which will be described in more detail later. The release lever 314 further carries a perpendicularly downwardly extending pin 314c arranged to operate a normally closed switch SM into open position each time the light value as photoelectrically sensed by the light value sensing means 346 is stored. This switch SM is provided with an actuating member 317 accessible from the outside of the camera housing for the purpose of retaining a once stored light value until the next new exposure metering result is positively stored.

The film winding and shutter cocking mechanism includes a shaft 308 having a film winding lever not shown mounted at the top end thereof and having a cam disk 309 coaxially fixedly mounted on the bottom end thereof, and a bellcrank lever 310 having a first pin 310a fixedly mounted at one end thereof and arranged to serve as a cam follower pin for the cam disk 309 and having a second pin 315b fixedly mounted on the other end thereof and arranged to be engageable with one end of an intermediate lever 307 pivoted at the shaft 306 the other end of which is engaged with a pin 312a mounted on the escapement 312, so that when lever 307 is turned counter-clockwise by bellcrank lever 310, the escapement 312 is turned clockwise against the force of spring 312d until the sector 218 is set in the cocked position by the third latch lever 316 through the lever arm 327-and-lever end 312e engagement, and the arresting lever 330 is disengaged from the star wheel 319c against the force of spring 331a. In order to transmit the cocking movement from escapement 312 to the release lever 314, there is provided a pin 312b perpendicularly downwardly extending from escapement 312 and arranged to be engageable with the end 314e of lever 314. In order to bring the first latch lever pawl 313b into engagement with the cocked release lever 314 against the force of spring 313c, there is provided a pin 310c fixedly mounted on bellcrank lever 310 arranged to cooperate with one arm 313e of first latch lever 313. This cocking mechanism also serves as the mirror resetting mechanism through the connection of pin 310b with an extension 311a of mirror drive lever 311.

The slide 351 operates with a lever 350 fixedly mounted on a shaft 349 and connected to a knob 348 which is accessible from the outside of the camera housing in such a manner that when the knob 248 is turned clockwise to place an index 348a provided thereon in alignment with a graduation indicative of examination of light value and focal depth at the preselected diaphragm value, the slide 351 is moved toward the left as viewed in FIG. 3 as guided by pin-and-slot connections against the force of a bias spring 351d, thereby the third latch lever 316 is disengaged from the sector 318 through the intermediary including L-shape lever 352 and a pin 351b mounted on the slide 351, and then the diaphragm drive lever 305 is turned clockwise in engagement with a pin 351a of slide 351 to bring the diaphragm blades from the maximum aperture position to a position corresponding to the preselected diaphragm value in cooperation with the pin 304, and a switch SD is closed by a pin 351c to switch the exposure metering circuit from the maximum aperture of diaphragm light metering mode to the reduced aperture of diaphragm light metering mode. A pole 353 of a circuit transfer switch having contacts 354 connected through respective leads to respective ends of magnetic windings of electromagnet $Mg_4$ is mounted on the opposite end of the shaft 349 to that connected to the knob 348, so that when the knob 348 is turned counter-clockwise from the illustrated position, the cam disk 355 is rotated one revolution through a not shown mechanical linkage and a magnetic flux is established in electromagnet $Mg_4$ to hold the lever 356 in the attracted position against the force of spring 356a. This event occurs when the exposure is made in the self-timer exposure control mode. After the exposure is terminated, a deactuating pulse is applied to the other magnetic winding of electromagnet $Mg_4$ to remove the light shielding plate 357 from the front of the eye piece 345, and simultaneously the knob 348 is returned to the illustrated position.

In FIG. 4, there is shown a schematic circuit diagram of four electronic control devices for the electromagnetic actuating devices of FIG. 3 adapted for association with an automatic exposure control circuit. The circuit of FIG. 4 essentially comprises an exposure metering circuit section A, a diaphragm controlling circuit section B including the magnetic winding 718 of electromagnet $Mg_2$, a first latch lever 313 release controlling circuit section C including the magnetic winding 738 of electromagnet $Mg_1$, a shutter front curtain controlling circuit section D including the magnetic winding 745 of electromagnet $Mg_{3a}$, a shutter rear curtain controlling circuit section F including the magnetic winding 754 of electromagnet $Mg_3$, and a power supply controlling circuit section E, each of which will next be described.

The exposure metering circuit section A includes a voltage stabilizer 702 connected through parallel-connected switches 701 and 756 to a battery 700, a photocell 346 such as silicon blue cell connected between a pair of inputs of an operational amplifier 704 with a log-diode 705 connected in the feedback network of amplifier 704. The output of the logarithmic amplifier 704 and 705 is combined with an output of a network including a constant current source 706 and a variable resistor 707 connected in series with each other. The resistance value of variable resistor 707 is adjusted in accordance with the preselected shutter speed and the sensitivity of the used film, so that an operational amplifier 708 responsive to the outputs from amplifier 704 and variable resistor 707 performs Appex computation to produce an electrical output signal representative of an effective exposure aperture, which is directed to the circuit section B through a switch 710 in the closed position, and to a meter 709 through switch SP in the closed position.

The diaphragm controlling circuit section B includes a store capacitor 713 capable of either temporally or continuously storing the output of amplifier 708 occurring just before the switch 710 is opened in synchronism with depression of a shutter release button, a comparator 714 having an input connected to the store capacitor 713 and having another input connected to the junction of the connection of series combination of a constant current source 711 and a variable resistor 712 corresponding to the variable resistor Ra of FIG. 3, a monostable multivibrator 715 (one shunt) responsive to the output of comparator 714 for producing an output which is then amplified by an amplifier 716 having an output connected to the magnetic winding 718 at one end thereof, the other end of which is connected through a switch 757 to the positive bus.

The power supply controlling circuit section E includes a differentiating circuit 719 connected between the positive bus and a switch 720 connected to the negative bus upon closure of switch 720 for producing a negative pulse which is applied to a set input of a bistable multivibrator 721, and a comparator 726 having a positive input terminal connected to the junction of connection of the series combination of resistors 722 and 723 and having a negative input terminal connected to the junction of the connection of series combination of a resistor 724 and a Zener diode 725, these combinations being connected between the positive and negative buses, so that upon attainment of the voltage of battery 700 to a critical voltage level, the comparator 726 produces an output which is applied to a NAND 727. Responsive to the incidence of occurrence of the outputs from multivibrator 721 and comparator 726, NAND 727 produces an output which renders conducting a switching transistor 728 connected in the positive bus between the sections E and C until a deactuating pulse is applied to the magnetic winding 754 controlling the rear shutter curtain in synchronism with a signal which is applied to the reset input terminal of multivibrator 721. Accordingly, when the actual voltage of battery 700 is lower than the critical voltage level, no electrical power is supplyed to the circuit sections B, C, D and F.

The first latch lever 313 release controlling circuit section C includes a timing circuit containing parallel-connected variable resistor 729 and fixed resistor 730, and a capacitor 732 connected to either of resistors 729 and 730 through a selector switch 731, and a voltage detecting circuit 733 having an input connected to the output terminal of the timing circuit and having an output terminal connected both to an input of a monostable multivibrator 735 and to the base electrode of a transistor 741. The output of multivibrator 735 is amplified by an amplifier 736 and is then applied to the magnetic winding 738 of electromagnet $Mg_1$ for a predetermined period of time. When the switch 731 is operated to connect the variable resistor 729 with the timing capacitor 732, the self-timer exposure control operation proceeds with an exposure time preselected by the variable resistor 729.

The shutter front curtain controlling circuit section D is almost similar in construction and arrangement to the circuit section C, including a timing circuit containing a variable resistor 739 and a capacitor 740, the switching transistor 741 with the emitter and collector electrodes connected across the capacitor 740, a voltage detector 742 having an input connected to the output of the timing circuit 739, 740 and having an output connected both to a monostable multivibrator 743 and to the base electrode of a switching transistor 750. The output of multivibrator 743 is amplified in passing through an amplifier 744, and therefrom applied to the magnetic winding 745 of electromagnet $Mg_{3a}$. As the conduction of transistor 741 is controlled by the output of the voltage detector 733 of circuit section D, the charging of capacitor 740 begins at the time when the first latch lever 313 is actuated. The RC time constant of the timing circuit 739, 740 is adjusted to permit the termination of movement of the mirror and diaphragm blades before the front curtain runs down.

In synchronism with application of a deactuating pulse of a predetermined duration to the magnetic winding 745, a timing circuit containing a shutter speed setting variable resistor 746 and either of capacitors 748 and 749 selectively connected in series to the variable resistor 746 through a switch 747 is rendered operative by the switching transistor 750. The output voltage of the timing circuit 746, 748, 749 is detected by a voltage detector 751 so that at the termination of the preselected shutter speed, a signal is applied from detector 751 to a monostable multivibrator 752 and therefrom to an amplifier 753. The output of amplifier 753 in the form of a pulse of predetermined duration is applied to the magnetic winding 754, causing the shutter rear curtain to run down. It is to be noted that as the shutter speed is increased, for example, from 1/1000 second to 32 seconds with increase in the resistance value of variable resistor 746, the current flowing therethrough is decreased to a very large extent, provided that the capacitance of the timing circuit is maintained constant. In order to avoid such a situation, there is provided two timing capacitors 748 and 749 arranged to be selectively connected to the variable resistor 746 by the switch 747 cooperative with the shutter speed setting dial not shown through a not shown mechanical linkage. At the termination of duration of the exposure time, a signal is applied from the multivibrator 752 to the reset input of the bistable multivibrator 721 to cut off the switching transistor 728. The magnetic windings 755', 757', 745' and 754' of the opposite polarity to that of the magnetic windings 738, 718, 745 and 754 in the electromagnets $Mg_1$, $Mg_2$, $Mg_{3a}$, and $Mg_3$ respectively are connected each in the collector circuit of a transistor $Tr$ with the emitter electrode connected to the negative bus and with the base electrode connected to the junction of the connection of series combination of a capacitor $C_1$ and a diode D.

OPERATION

In order to make an exposure in the shutter preselection automatic exposure control mode, the diaphragm preselecting ring 301 is turned to place symbol "EE" in registry with the index 302 as shown in FIG. 3, causing the cam follower pin 332 to ride on the cam lobe 301b, thereby switch SP is closed to connect the meter 709 to the exposure metering circuit A. Next, when the switch 701 is closed, an actuating pulse of predetermined duration is applied to each of the magnetic windings 755', 757', 745' and 754' to establish a magnetic flux of certain magnitude in each of the cores of electromagnets $Mg_1$, $Mg_2$, $Mg_{3a}$ and $Mg_3$, respectively, and, at the same time, the exposure metering circuit is rendered operative. Next, when the camera is aligned with an object to be photographed, a fraction of the light entering through the objective lens is received by the light value sensing means 346 positioned behind the penta prism 344, and the operational amplifier 708 produces an output signal with magnitude proportional to the logarithm of the level of brightness of the object. The shutter speed setting circuit 706 and 707 produces a signal with magnitude proportional to the preselected shutter speed. Responsive to these signals and, if necessary, additional signals with magnitude proportional to the film speed and maximum aperture compensation factor, the computer 708 produces an output signal representing an exposure value, or effective exposure aperture which is then applied to the store capacitor 713. The effective exposure aperture can be read by the help of the meter 709.

When the shutter release button 347 is depressed to close switch $SR_1$ or 720, a deactuating pulse of predetermined duration is applied to the magnetic winding 738 of electromagnet $Mg_1$ to disengage the first latch lever pawl 313b from the release lever end 314a, thereupon the lever 314 is turned counter-clockwise under the action of spring 314f. Such a turning movement of release lever 314 causes the switch SM or 710 to be opened by the pin 314b, so that the light value is stored in the capacitor 713 in the form of a voltage, and causes a clockwise movement of the second latch lever 315 and further causes a counter-clockwise movement of the third latch lever 316.

As the third latch lever 316 is turned counter-clockwise, its pawl is disengaged from the projection of gear sector 318, permitting sector 318 to move clockwise under the action of spring 303a which overcomes the force of spring 318c connected between the sector 318 and the camera housing. Such a turning movement of sector 318 causes a sliding movement of slider $Ra_1$ on the arcuate resistor strip $Ra$, while varying the resistance value of the variable resistor $Ra$–$Ra_1$, or 712. When the voltage across resistor 712 as detected by comparator 714 has reached a level dependent upon the voltage stored on the capacitor 713, the comparator 714 produces an output which is converted to a deactuating signal in passing through the multivibrator 715 and amplifier 716. When the deactuating signal is applied to the magnetic winding 718 of electromagnet $Mg_2$, the arresting lever 330 is turned counter-clockwise to arrest the counter-clockwise rotating star wheel 319c. This turning movement of sector 318 also causes a downward movement of the control lever 329 which in turn causes a clockwise movement of diaphragm presetting ring 303, thereby the final angular position of ring 303 is determined in accordance with the object brightness level, preselected shutter speed, film speed, and a particular value of the maximum aperture compensation factor.

As the second latch lever 315 is turned clockwise, the spring powered mirror drive lever 311 is disengaged at the projection 311c from the latch lever pawl 315b, and is then turned counter-clockwise under the action of spring 311d in combination with the control lever 337 through the return control lever 336, causing the diaphragm drive lever 305 to be turned clockwise about shaft 306 through the extension 337b-and-extension 305c connection against the force of spring 305a, while moving the pin 304 which operates with the diaphragm blade drive ring in the lens aperture mechanism, thereby the size of the diaphragm aperture is varied from the maximum one to a particular one dependent upon the angular position of diaphragm presetting ring 303. At the same time, the hold switch SH or 756 is closed. As the control lever 337 is turned counter-clockwise, the mirror 338 is moved from its viewing position to its non-viewing position.

In response to the turning-on of the voltage detector 733, the delay circuit containing resistor 739 and capacitor 740 is rendered operative to provide a time interval, during which the lens aperture mechanism is adjusted. At the termination of duration of this time interval, the amplifier 736 produces a deactuating pulse which is applied to the magnetic winding 738 of electromagnet $Mg_{3a}$ controlling the front curtain, thereby the front curtain latch lever 333 is turned clockwise under the action of spring 333a to disengage the pawl of lever 333 from detent pin 334a, permitting gear 334 to turn counter-clockwise under the action of a not shown spring, while rotating pinion 335 engaging therewith to effect the running off of the front curtain. After a time interval from the initiation of an exposure determined by the timing circuit containing resistor 746 and capacitor 748 or 749, a deactuating pulse is produced from amplifier 753 which is applied to the magnetic winding 754 of electromagnet $Mg_3$ controlling the rear shutter curtain, thereby the latch lever 340 is turned clockwise to disengage the pawl of lever 340 from the detent pin 339a. As the gear 339 is turned counter-clockwise under the action of a not shown spring, the pinion 340c is rotated permitting the rear curtain to run down, thereby the exposure is terminated. At the termination of rotation of gear 339, the detent pin 339a strikes one arm of transfer lever 341, causing lever 341 to turn counter-clockwise against the force of spring 341a. Such a turning movement of lever 341 causes disengagement of mirror return control lever 336 from the projection 311b of drive lever 311 which in turn causes a clockwise movement of control lever 337 and causes a counter-clockwise movement of diaphragm drive lever 305. During this time, the mirror 338 is returned to the viewing position under the action of the return spring 338c, and the hold switch SH or 756 is set to the opened position. As the lever 305 is turned counter-clockwise, the pin 304 is moved to the initial position where the diaphragm blades are in the maximum aperture position.

After the exposure has been terminated, the film winding lever may be cocked to advance the film through the length of a frame and to set the shutter to the cocked position, while turning the shaft 308 in the counter-clockwise direction indicated by the arrow. During this time, the cam disk 309-and-follower pin 310a connection causes a clockwise movement of the bellcrank lever 310 which in turn causes a counter-clockwise movement of intermediate lever 307. The movement of lever 307 is transmitted to escapement 312 through the engagement with pin 312a, thereby escapement 312 is turned clockwise against the force of spring 312d, while turning the arm 327 clockwise about the shaft 322 in engagement with the escapement arm 312e to bring the sector 318 into the latched position by the third latch lever pawl 316, turning the arresting lever 330 clockwise to disengage its pawl from the star wheel 319c, and turning the release lever 314 clockwise through the pin 312b-and-lever end 314e connection to bring the lever end 314a into engagement with the first latch lever pawl 313b. As a result, all of the shutter, diaphragm and mirror mechanisms are set to their cocked positions.

When the "EE" lock button 317 is depressed, switch SM or 710 is always set in the open position, so that the voltage stored on capacitor 713 can be utilized in making subsequent exposures.

In order to make an exposure in the manual exposure control mode, the diaphragm preselecting ring 301 is turned to place a desired graduation of diaphragm scale on ring 301 in registry with index 2, thereby the cam lobe 301b is moved away from pin 304 causing to open switch SP. When the shutter release button 347 is depressed to close switch $SR_1$ or 720, a deactuating pulse is applied to the magnetic winding of electromagnet $Mg_1$, thereby the first latch lever pawl 313b is disengaged from the release lever end 314e to turn lever 314 counter-clockwise direction under the action of spring 314f. Such a counter-clockwise movement of release lever 314 results in disengagement of the third latch lever 316 from the gear sector 318, permitting the sector 318 to turn clockwise under the action of spring 303a but against the force of spring 318c, until the projection 303b of the presetting ring 303 abuts the projection 301a of ring 301, thereby the position of the bellcrank is adjusted in conformance with the preselected diaphragm value. The counter-clockwise movement of release lever 314 also causes a clockwise movement of the second latch lever 315 to actuate the mirror drive lever 311, thereby the mirror and lens aperture mechanisms are operated and then the electromagnet $Mg_{3a}$ establishes no magnetic flux to initiate an exposure. The subsequent operation proceeds in a manner similar to that shown in connection with the shutter preselection automatic exposure control mode.

The operation of the reduced aperture of diaphragm light metering or focal depth viewing mechanism is as follows. When the knob 348 is turned about the shaft 349 in the clockwise direction from the illustrated position, the slide 351 is displaced toward the left, thereby the third latch lever 316 is disengaged from the sector 318 through L-shape lever 352, causing the diaphragm presetting ring 303 to turn clockwise under the action of spring 303a until the projection 303b abuts projection 301a. At the same time, the pin 351a turns the diaphragm drive lever 305 about the shaft 306 in the clockwise direction, while moving the pin 304 toward the left to reduce the size of the diaphragm aperture from the maximum one to a particular one corresponding to the preselected diaphragm value.

Figure 5:
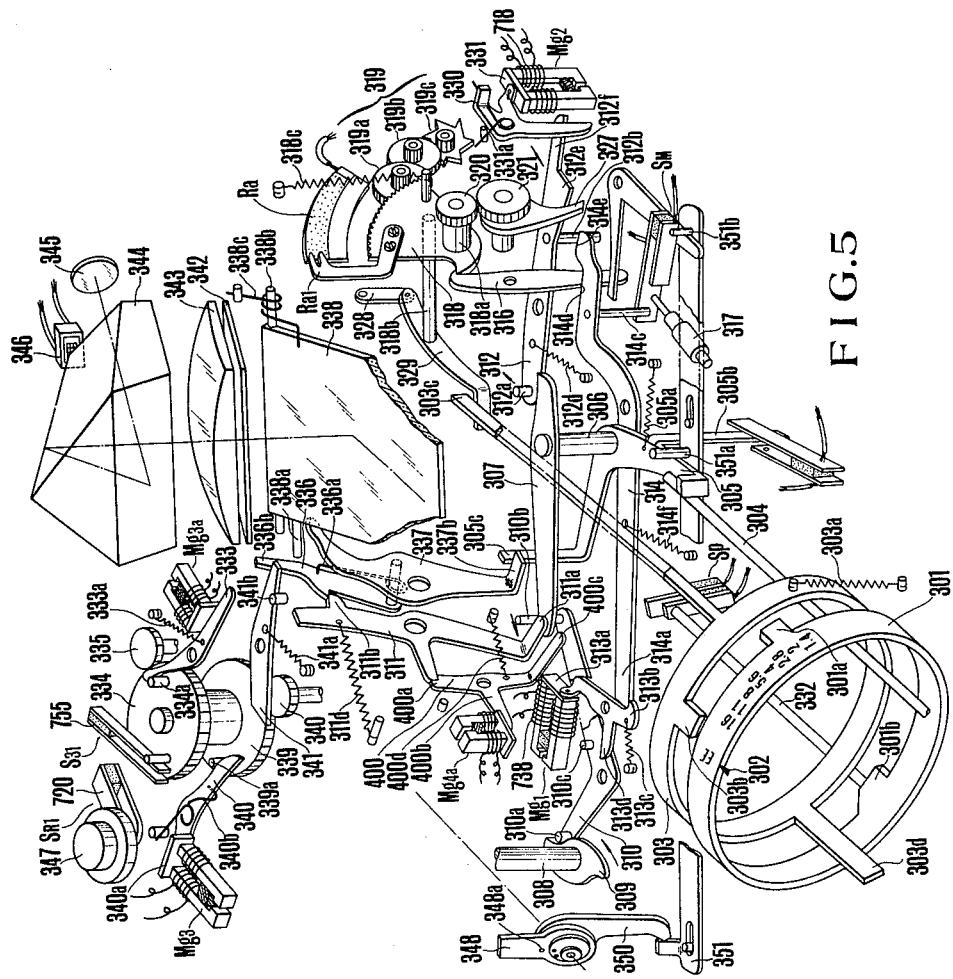
FIG. 5 shows a variation of the camera of FIG. 4, wherein an additional magnetic actuating device of the present invention is associated with a mirror control mechanism.

FIG. 5 shows an example of variation of the apparatus of FIG. 3, wherein whilst the mirror and diaphragm control mechanisms of FIG. 3 is associated with a common magnetic actuating device of the invention, the mirror control mechanism of FIG. 5 is associated with a separate magnetic actuating device of the invention. In FIG. 5, the second latch lever 315 is replaced by a three-armed lever 400 arranged with one arm 400a engaging with an arm 311e of mirror drive lever 311 in the cocked position, with another arm 400b bearing an armature cooperative with an electromagnet $Mg_{4a}$, and with the other arm 400c extending into the path of movement of the pin 310b mounted on the resetting bellcrank lever 310. With this arrangement of the magnetic actuating device $Mg_{4a}$ and 400, it is made possible to control the initiation of movement of the mirror and diaphragm drive mechanisms in variable time-displaced relation to the termination of movement of the diaphragm control mechanism, thereby the running-down of the front curtain is prevented from beginning before the diaphragm blades is completely set in the adjusted setting without the necessity of using any complicated mechanical delay means having such a function.

Figure 6:
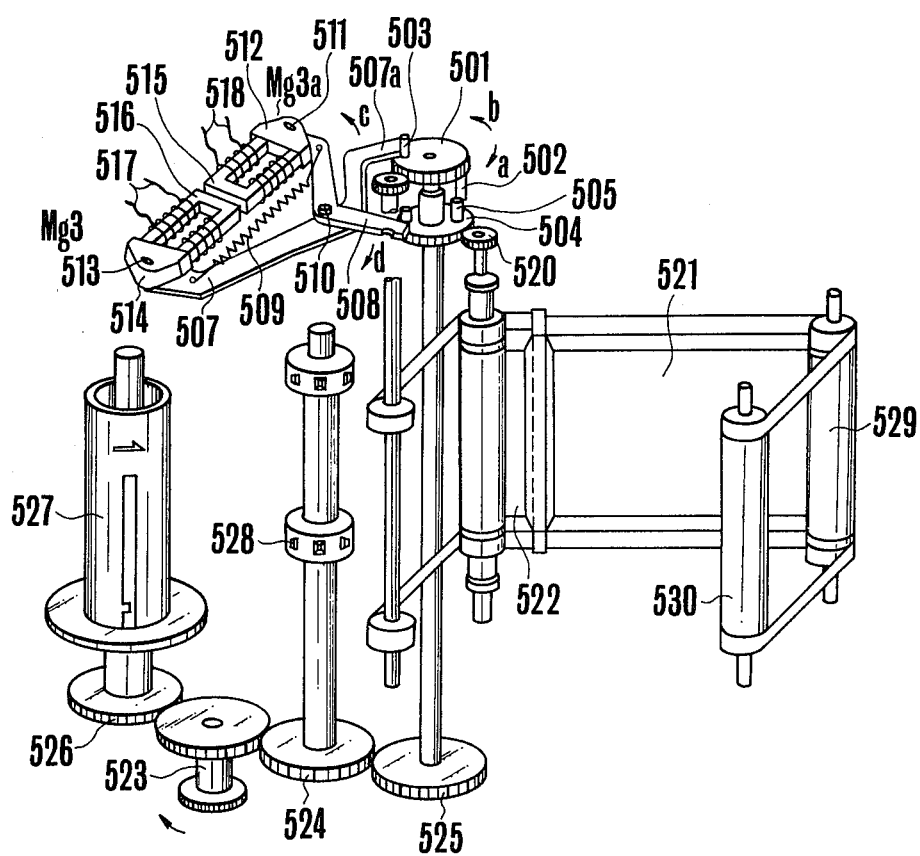
FIG. 6 is a schematic exploded perspective view of another type shutter mechanism employing a pair of magnetic actuating devices according to the invention.

FIG. 6 shows another example of application of the magnetic actuating device of the invention to a two-curtain type focal plane shutter. The apparatus of FIG. 6 is assumed to be in the cocked position, there is provided two electromagnets $Mg_3$ and $Mg_{3a}$ positioned in opposed alignment with each other, and their single or double magnetic windings 517 and 518 have yokes 516 and 515 made of the red rectangular hysteresis effect produceable magnetic substance and have armatures 514 and 512 made of the rectangular hysteresis effect produceable magnetic substance or a soft magnetic substance and movably mounted on front and rear curtain latch levers 507 and 508 respectively which are biased by a common spring 509 so that when no magnetic flux is established in the yokes, detent pins 503 and 506 mounted on front and rear curtain control gears 501 and 504 in eccentrically parallel relation with the common shaft of gears 501 and 504 are disengaged from the latch levers 507 and 508 respectively.

When a deactuating pulse is applied from a control circuit which may be of the type shown in FIG. 2a to the magnetic winding 517, the front curtain latch lever 507 is turned about a common pivot pin 510 in the direction indicated by arrow "c" as the front curtain control gear 501 is pretensioned by a spring mounted within a front curtain winding-up drum 529 through a pinion 519, thereby gear 501 is rotated in the direction indicated by arrow "b" permitting the front curtain to run down. At the termination of duration of an exposure time, a deactuating pulse is applied to the magnetic winding 518 to release the rear shutter curtain control gear 504 from the latched position by lever 508 under the action of spring mounted within a rear curtain winding-up drum 530, thereby the exposure is terminated.

When a film winding lever not shown is cocked, the cocking motion is transmitted through a gear train including gears 526, 523, 524 and 525 to the front curtain control gear 501, and therefrom to the rear curtain control gear 504 through a pin 502-and-pin 505 engagement to set the shutter to the cocked position.

FIG. 7 shows still another example of application of the magnetic actuating device of the invention to a focusing apparatus of a camera with an objective lens having a focusing member. The focusing apparatus comprises a control gear ring 601 arranged in the mechanical mounting of the objective lens upon rotation of ring 601 to effect axial movement of the focusing lens member, a pinion 602 meshing with a gear 601a formed around the external periphery of ring 601 and fixedly mounted on a shaft 603 at one end thereof, the opposite end of which fixedly carries a one-way clutch constructed with a cam 604, rollers 605 and a ring 606, a gear train containing a pinion 607 meshing with teeth formed on the external periphery of the ring 606, a gear 608 coaxially affixed to the pinion 607, a pinion 609 meshing with the gear 608 and a star wheel 610, an arresting mechanism for the star wheel 610 associated with a second magnetic actuating device of the invention, a speed reducing and shock buffering mechanism comprising a motion transmission 611 interconnecting the clutch ring 606 and a pinion 612 and a frictional member 613 connected to the pinion 612 and arranged to be slidably movable on the internal periphery of a fixed ring 614 coaxial to the shaft of the pinion 612, a first magnetic actuating device of the invention, and a resetting mechanism. The first magnetic actuating device comprises an electromagnet $Mg_1$ having a pair of magnetic windings 648 and 650 and an armature 615 fixedly mounted on the focusing control ring 601 and biased by a spring 616 which tends to urge the armature with ring 601 for rotation in a clockwise direction about the optical axis of the objective lens. The resetting mechanism comprises a pin 617 extending into the path of movement of armature 615, a lever 618 pivoted at a shaft 619 and fixedly carrying the pin 617, a spring 620 connected between the lever 618 and a pin 631, an arm 622 radially extending from the shaft 619 into the path of movement of a pin 623a mounted on a control disk 623 in eccentric relation to the shaft 624 thereof. In order to limit the clockwise movement of lever 618, there is provided a stopper pin 621. The arresting mechanism comprises a pawl lever 625 fixedly mounted on the shaft 619 at the opposite end thereof to that connected with the lever 618 and arranged with its pawl 625a for operative engagement with the star wheel 610 and with its tail 625b for actuation of a switch 647, a lever 626 pivoted at a pin 627 and biased by a spring 628 connected to a pin 629 for turning movement in a counter-clockwise direction about pin 627. The lever 626 is preferably made of the rectangular hysteresis effect produceable substance, but may be made of a soft magnetic substance, constituting part of the second magnetic actuating device having an electromagnet $Mg_2$ with a pair of magnetic windings 649 and 651.

Figure 7B:
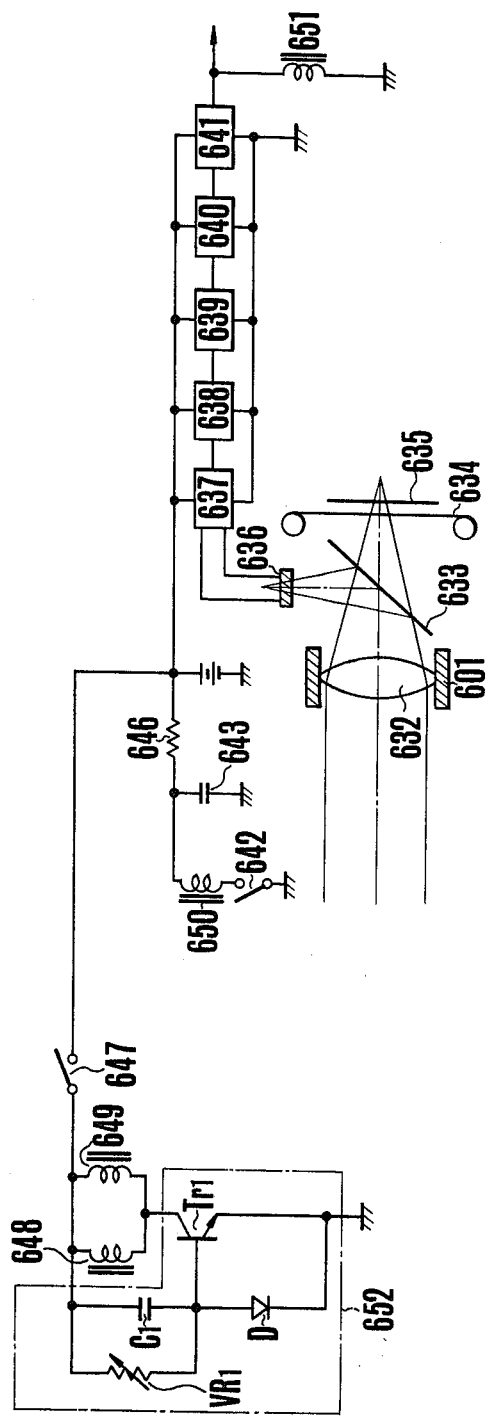

In FIG. 7b, there is shown an electrical circuit for controlling operation of the apparatus of FIG. 7a. The circuit comprises a photoconductive element 636 having a light sensitive image receiving surface arranged to receive a fraction of light entering through an objective lens having a focusing lens member 632 mounted in the ring 601 after reflection from a half-mirror 633 positioned between the objective lens and a shutter 634 in front of a film 635, a first amplifier 637, a differentiator 638, a rectifier 639, a pulse shaper 640 and a second amplifier 641 successively connected with each other and each connected between the positive and negative terminals of a battery 645. The output of the second amplifier 641 is connected to the deactuating magnetic winding 651 of electromagnet $Mg_2$. The deactuating magnetic winding of electromagnet $Mg_1$ is connected at one end thereof through a differentiating network containing a resistor 646 and a capacitor 643 to the positive terminal of battery 645, and is connected at the opposite end thereof through a start switch 642 to the ground. The actuating magnetic windings 648 and 649 of electromagnets $Mg_1$ and $Mg_2$ are connected in a common control circuit similar in construction and arrangement to that shown in FIG. 2a and FIG. 4, being cooperative of the switch 647.

The operation of the automatic focusing apparatus of FIG. 7 is as follows. The mechanism of FIG. 7a is assumed to be in a position ready for exposure and wherein the objective lens is focused to an object at infinity. It is, of course, possible to apply the present invention to another type of focusing mechanism which in the initial operative position focuses the objective lens to an object at the lower limit of a focusing range thereof. When the photographer depresses the start switch 624, a deactuating pulse is applied to the winding 650 of electromagnet $Mg_1$ to establish no magnetic fluxed therein, thereby the ring 601 begins to rotate clockwise. The output of the photoconductive element 636 varies with variation in sharpness of the image which is to be formed on the surface of the film as shown in FIG. 7c by a graph "c", reaching the maximum at the maximum sharpness of the image. This output is amplified and modified in succession as shown in graphs "d", "e", "f", "g" and "h" in FIG. 7c by the parts 637 through 641 respectively. The deactuating pulse is applied to the magnetic winding 651 of electromagnet $Mg_2$ to establish zero magnetic flux therein, thereby the lever 626 is turned counter-clockwise about the pivot pin 627 under the action of spring 628 causing the arresting lever pawl 625a to be brought into arresting engagement with one of the teeth of the ever-rotating star wheel 610, thereby the objective lens is focused to a particular object being photographed. During this focusing operation, the mechanism of the parts 611 through 614 serves to maintain the speed of rotation of the focusing control ring 601 at a level suitable for the processing of the signal from the photoconductive element 636. The output of the second amplifier 641 is also applied to the magnetic winding of the electromagnet $Mg_1$ of FIG. 3. to initiate the exposure control operation of the camera.

When the film winding lever not shown is cocked, the resetting disk 623 is rotated one revolution in the direction indicated by the arrow, thereby the arm 622 is turned counter-clockwise through the pin 623a-and-lever 622 end engagement. As the arm 622 is turned counter-clockwise against the force of spring 620, the armature 615 is brought to the initial position against the force of spring 616, and, at the same time, the switch 647 is closed by the arresting lever tail 625b to apply an actuating pulse to each of the magnetic windings 648 and 649 of electromagnets $Mg_1$ and $Mg_2$, thereby the armature 615 and the lever 626 are held in their attracted or cocked positions.

It will be seen from the foregoing description that the present invention contemplates utilization of memorizing characteristics of the semi-hard magnetic substance in constructing an electromagnetic actuating device adapted to operate with actuating and deactuating pulses of relatively short duration. In addition to the highly accurate actuation control, the magnetic actuating device of the invention has a possibility of compensating deviation of the actual performance of the mechanism associated therewith from the designed one.

What is claimed is:

1. An electromagnetic actuating device adapted to control initiation of release of at least one internal mechanism of a photographic camera, which device comprises:

an electromagnet, having:
   (a) a core made of a semihard magnetic substance having magnetizing characteristics forming a substantially rectangular hysteresis loop;
   (b) coil wound around said core;
   (c) an armature associated with said mechanism and arranged to be fixed in position when a magnetic flux is established in said core and to be movable with reference to said electromagnet when no magnetic flux is established in said core;
   (d) biasing means for making said armature movable when there is no magnetic flux in said core;

a first power supply means connected to said coil, wherein said means has a first switch and adds pulse current to said coil for only a short period of time in association with the action of said first switch to magnetize said core;

a second power supply means connected to said coil, wherein said means has a second switch and adds a pulse current, which is reverse to the pulse current from said first power supply means, to the coil in association with the action of said second switch to demagnetize said core, whereby after said electromagnet core is maintained in the magnetized state for a period of time after the termination of the application of said actuating pulse, said deactuating pulse is applied to said coil to initiate the release of said mechanism.

2. An electromagnetic actuating device according to claim 1, wherein said coil has a pair of windings, one of which is coupled to said first electronic control means, and another winding which is coupled to said second electronic control means.

3. An electromagnetic actuating device according to claim 1, wherein said first power supply means has a differentiation circuit and a transistor and places the transistor in an ON state with the differentiation pulse of the differentiation circuit by closing of a power source switch, to add magnetizing current to the coil.

4. An electromagnetic actuating device according to claim 3, wherein said second power supply means has a time constant circuit, a level detection circuit and a transistor, and which turns the transistor into an ON state with the output of the level detection circuit after an elapse of such period of time determined by a time constant circuit from the initiation action of said start swithc, to add demagnetizing current to the coil.

5. An electromagnetic actuating device according to claim 4, wherein said first power supply means and said second power supply means are connected in parallel, and said coil is connected between the transistor of the first power supply means and the transistor of the second power supply means.

* * * * *

UNITED STATES PATENT OFFICE
CERTIFICATE OF CORRECTION

Patent No. 4,099,192          Dated July 4, 1978

Inventor(s) HIROSHI AIZAWA, M. UCHIDOI, et al

It is certified that error appears in the above-identified patent and that said Letters Patent are hereby corrected as shown below:

In the heading of the patent [75] should read as follows:

[75] Inventors: Hiroshi Aizawa, Tokyo; Masanori Uchidoi, Kanagawa-ken; Hideaki Miyakawa, Tokyo; Masayoshi Yamamichi, Kanagawa-ken; Yukio Iura, Kanagawa-ken; Masahisa Fukui, Yokohama; all of Japan

Signed and Sealed this

Fifth Day of December 1978

[SEAL]

Attest:

RUTH C. MASON
*Attesting Officer*

DONALD W. BANNER
*Commissioner of Patents and Trademarks*